US008253826B2

(12) United States Patent
Aisaka et al.

(10) Patent No.: US 8,253,826 B2
(45) Date of Patent: Aug. 28, 2012

(54) PHOTOGRAPHING APPARATUS AND METHOD, AND PROGRAM (75) Inventors: Kazuki Aisaka, Kanagawa (JP); Masatoshi Yokokawa, Kanagawa (JP); Jun Murayama, Tokyo (JP); Takefumi Nagumo, Kanagawa (JP); Ken Tamayama, Tokyo (JP); Tatsuo Fujiwara, Tokyo (JP); Tamaki Eyama, Tokyo (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 12/753,741

(22) Filed: Apr. 2, 2010

(65) Prior Publication Data

US 2010/0259649 A1 Oct. 14, 2010

(30) Foreign Application Priority Data

Apr. 10, 2009 (JP) ................................ P2009-095792

(51) Int. Cl.
*H04N 5/217* (2011.01)
(52) U.S. Cl. ....................................................... 348/241
(58) Field of Classification Search ................. 348/222.1
See application file for complete search history.

(56) References Cited

U.S. PATENT DOCUMENTS

| 6,240,256 | B1* | 5/2001 | Hozumi et al. ............... 396/223 |
| 2005/0212955 | A1* | 9/2005 | Craig et al. ................... 348/362 |
| 2009/0213250 | A1* | 8/2009 | Alakarhu et al. ............. 348/243 |
| 2010/0271505 | A1* | 10/2010 | Zimmer et al. ............. 348/231.2 |

FOREIGN PATENT DOCUMENTS

JP 2002-152558 5/2002

* cited by examiner

*Primary Examiner* — James Hannett
(74) *Attorney, Agent, or Firm* — Finnegan, Henderson, Farabow, Garrett & Dunner, L.L.P.

(57) ABSTRACT

A photographing apparatus is provided, which includes: a correction data acquiring section that acquires correction data for image correction; a recording section that records the correction data acquired by the correction data acquiring section; a photographing condition acquiring section that acquires image photographing conditions; a retrieving section that retrieves the correction data, corresponding to the photographing conditions acquired by the photographing condition acquiring section, from the correction data recorded in the recording section; and a photographing section that photographs an image on the basis of the correction data retrieved by the retrieving section.

5 Claims, 8 Drawing Sheets

PHOTOGRAPHING APPARATUS AND METHOD, AND PROGRAM

BACKGROUND OF THE INVENTION

1. Field of the Invention

The present invention relates to photographing apparatus and method, and a program, and in particular, relates to photographing apparatus and method, and a program capable of photographing an image which is more suiting a user's taste.

2. Description of the Related Art

In the past, various techniques for assisting photographing by a user have been proposed in a photographing apparatus such as a digital camera.

For example, there are cameras which cause a plurality of compositions to be displayed on a finder, and cause a user to select any of the compositions at the time of photographing (see Japanese Unexamined Patent Application Publication No. 2002-152558).

SUMMARY OF THE INVENTION

However, in the above-mentioned configuration, since a plurality of compositions is automatically set up by the camera, the user is not necessarily able to select the favorite composition.

The present invention addresses the above-identified and other problems, and in particular, is for the purpose of photographing an image which is more suiting a user's taste.

A photographing apparatus according to an embodiment of the present invention includes: a correction data acquiring means for acquiring correction data for image correction; a recording means for recording the correction data acquired by the correction data acquiring means; a photographing condition acquiring means for acquiring image photographing conditions; a retrieving means for retrieving the correction data, corresponding to the photographing conditions acquired by the photographing condition acquiring means, from the correction data recorded on the recording means; and a photographing means for photographing an image on the basis of the correction data retrieved by the retrieving means.

The correction data may be configured to include correction parameters representing content of correction of the image, and photographing information which is information for photographing of the image.

The photographing apparatus may be further provided with a correction means for correcting the image photographed by the photographing means on the basis of the correction parameters of the correction data retrieved by the retrieving means.

The photographing apparatus may be further provided with a photographing control means for adjusting photographing parameters in the photographing means on the basis of the photographing information of the correction data retrieved by the retrieving means, and may cause the photographing means to photograph the image on the basis of the photographing parameters adjusted by the photographing control means.

The photographing information may be configured to include Exif (Exchangeable image file format) information of the image, and the photographing conditions when the image is photographed, and the photographing control means may adjust the photographing parameters in the photographing means, on the basis of the Exif information which is included in the photographing information corresponding to the photographing conditions acquired by the photographing condition acquiring means.

A photographing method according to another embodiment of the present invention includes the steps of: acquiring correction data for image correction; recording the correction data acquired by a process of the correction data acquiring step; acquiring image photographing conditions; retrieving the correction data, corresponding to the photographing conditions acquired by a process of the photographing condition acquiring step, from the correction data recorded by the recording step; and photographing an image on the basis of the correction data retrieved by a process of the retrieving step.

A program according to another embodiment of the present invention causes a computer to execute processes including the steps of: acquiring correction data for image correction; controlling recording of the correction data acquired by a process of the correction data acquiring step; acquiring image photographing conditions; retrieving the correction data, corresponding to the photographing conditions acquired by a process of the photographing condition acquiring step, from the correction data recorded by the recording controlling step; and controlling photographing of an image on the basis of the correction data retrieved by a process of the retrieving step.

In another embodiment of the present invention, correction data of image correction are acquired, the acquired correction data are recorded, image photographing conditions are acquired, correction data corresponding to the acquired photographing conditions are retrieved from the recorded correction data, and a non-image is photographed on the basis of the retrieved correction data.

According to an embodiment of the present invention, it is possible to photograph an image which is more suiting a user's taste.

DESCRIPTION OF THE PREFERRED EMBODIMENTS

Hereinafter, the embodiments of the present invention will be described with reference to the drawings. The descriptions thereof are performed in the following order.

1. First Embodiment (Example of Photographing Apparatus Unit)
2. Second Embodiment (Example of Image Processing System)

1. First Embodiment

Configuration Example of the Photographing Apparatus

Figure 1:
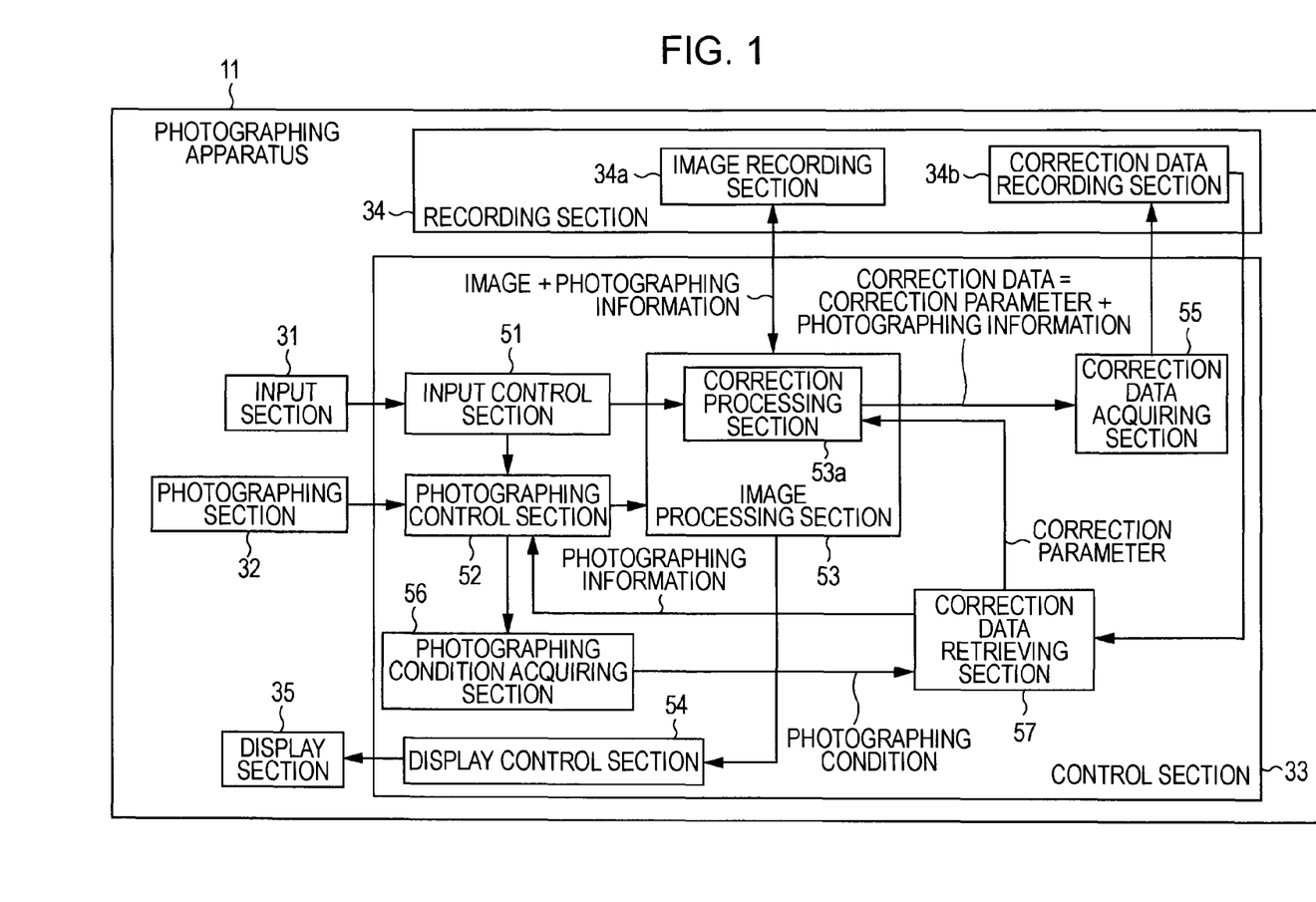
FIG. 1 is a block diagram illustrating a configuration example of an embodiment of a photographing apparatus to which the present invention is applied.

FIG. 1 is a configuration example of an embodiment of the photographing apparatus to which the present invention is applied. A photographing apparatus 11 of FIG. 1 is an electronic device with a photographing function such as, for example, a digital camera or a cellular phone.

The photographing apparatus 11 of FIG. 1 includes an input section 31, a photographing section 32, a control section 33, a recording section 34, and a display section 35.

The input section 31 is operated by a user in order to input instructions to the photographing apparatus 11. The input section 31 includes, for example, various types of operation buttons, a keyboard, a mouse, a remote control, a touch panel, a microphone and the like, and accepts an operation from the user to supply a signal (information) indicative of the content of the operation thereof to the control section 33.

The photographing section 32 includes a photoelectric conversion element that converts an optical image of a CCD (Charge Coupled Device) or CMOS (Complementary Metal-Oxide Semiconductor) sensor and the like into an electrical signal, and an optical system that images an optical image of a subject to the photoelectric conversion element, or the like. The photographing section 32 converts the image of the subject into an image signal which is an electrical signal on the basis of control of the control section 33, that is, photographs the subject, and then supplies the obtained image signal to the control section 33. Meanwhile, in the following, photographing a subject is also referred to as photographing an image and the like.

The control section 33 includes, for example, a microprocessor and the like, and controls the whole photographing apparatus 11. For example, the control section 33 performs a predetermined process on the image signal from the photographing section 32, and supplies and records the obtained image data and information relating to the image data to the recording section 34. In addition, the control section 33 reads out the image data and information relating to the image data from the recording section 34, performs a predetermined process, and supplies the obtained image data to the display section 35.

The control section 33 implements an input control section 51, a photographing control section 52, an image processing section 53, a display control section 54, a correction data acquiring section 55, a photographing condition acquiring section 56, and a correction data retrieving section 57, by executing a computer program.

The input control section 51 controls the input section 31, acquires a signal indicative of instructions of a user from the input section 31 in response to an operation of the user, and supplies the signal to the photographing control section 52 and the image processing section 53.

The photographing control section 52 controls the photographing section 32 on the basis of a signal (information) from the input control section 51 or the correction data retrieving section 57, and controls photographing of the subject by the photographing section 32. The photographing control section 52 generates image data from image signals supplied from the photographing section 32, and supplies the generated image data to the image processing section 53.

The image processing section 53 performs an appropriate and predetermined process on image data from the photographing control section 52, and supplies the image data to the recording section 34. In addition, the image processing section 53 reads out image data from the recording section 34, performs an appropriate and predetermined process, and supplies the image data to the display control section 54.

The image processing section 53 includes a correction processing section 53a. The correction processing section 53a performs a predetermined correction process (corrects the image) with respect to the image data on the basis of a signal (information) from the input control section 51 or the correction data retrieving section 57. At this time, the correction processing section 53a generates correction data relating to correction.

The display control section 54 controls a display from the display section 35. More particularly, the display control section 54 generates display data for displaying the image on the basis of the image data from the image processing section 53, and supplies the display data to the display section 35, to thereby display the image to the display section 35.

The correction data acquiring section 55 acquires correction data generated in the image processing section 53, and supplies the correction data to the recording section 34.

The photographing condition acquiring section 56 acquires information, which is indicative of photographing conditions of photographing of the subject in the photographing section 32, from the photographing section 32 via the photographing control section 52, and supplies the information to the correction data retrieving section 57.

The correction data retrieving section 57 retrieves correction data corresponding to the information indicative of photographing conditions (hereinafter, simply referred to as photographing conditions) of photographing of the subject in the photographing section 32, which is supplied from the photographing condition acquiring section 56, from correction data recorded in the recording section 34. The correction data retrieving section 57 supplies a signal for instructing correction of the image data to the correction processing section 53a on the basis of the retrieved correction data, or supplies a signal for controlling photographing by the photographing section 32 to the photographing control section 52.

The recording section 34 includes a hard disk drive, an optical disk such as a DVD (Digital Versatile Disk) driven by a predetermined drive and a drive thereof, or a semiconductor memory such as a memory card. The recording section 34 records image data from the control section 33, and information relating to the image data. In addition, the recording section 34 includes an image recording section 34a and a correction data recording section 34b. The image recording section 34a records image data to be supplied from the image processing section 53 of the control section 33, and the correction data recording section 34b records correction data to be supplied from the correction data acquiring section 55 of the control section 33.

The display section 35 includes a display device such as an LCD (Liquid Crystal Display) or an organic EL (Electro Luminescence), and displays various types of images on the basis of control of the control section 33.

Image Correction Process of the Photographing Apparatus

Figure 2:
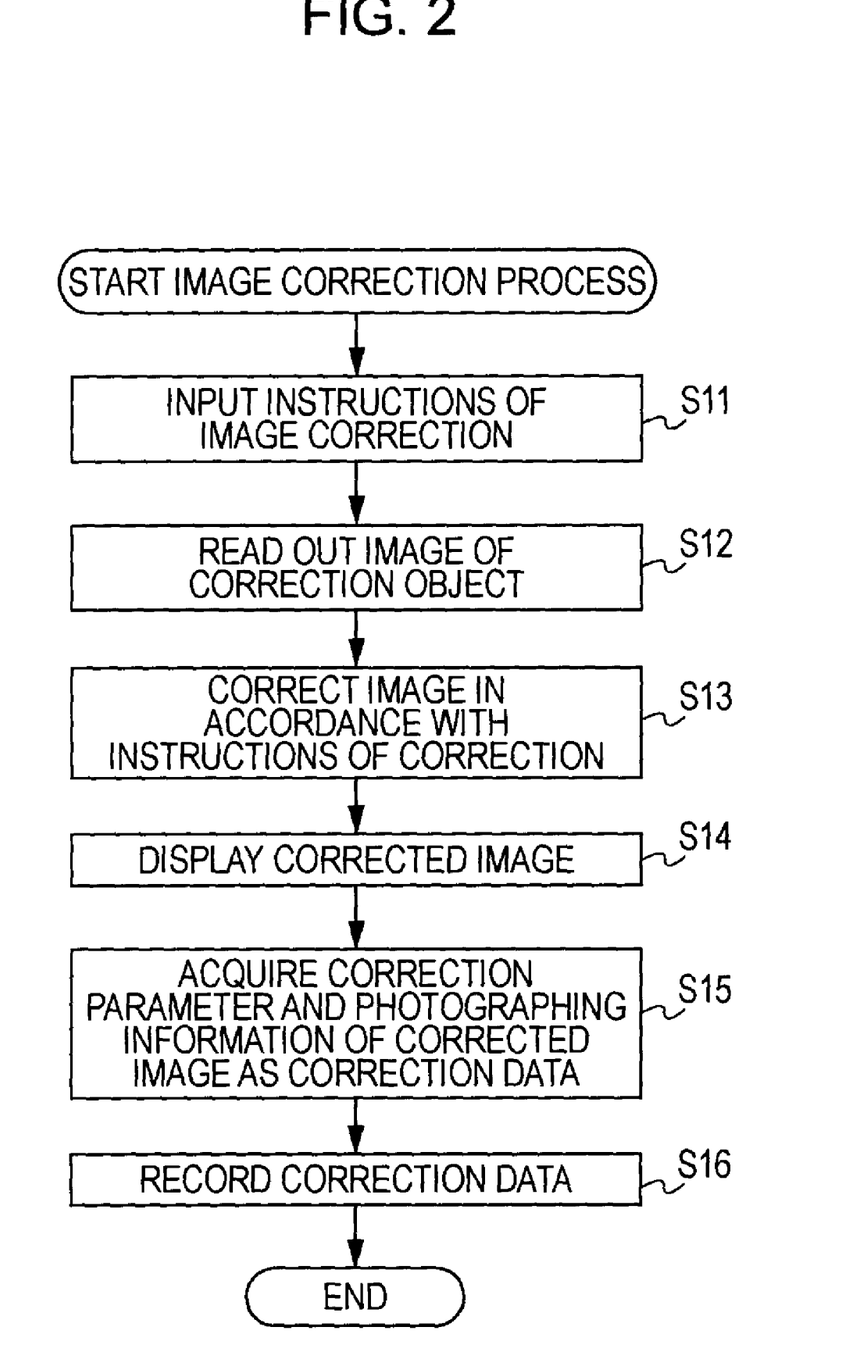
FIG. 2 is a flow chart for describing an image correction process.

Next, an image correction process by the photographing apparatus 11 will be described with reference to a flow chart of FIG. 2. When the image correction process is executed, an image photographed by the photographing section 32 is previously recorded in the image recording section 34a of the photographing apparatus 11.

The photographing apparatus 11 starts a process when, for example, the input section 31 is operated, and the input control section 51 acquires instructions of selection of a correction data recording mode.

In step S11, the input section 31 accepts an operation from a user, and inputs image correction instructions. The input control section 51 acquires a signal indicative of image correction instructions (hereinafter, simply referred to as correction instructions) from the input section 31 along with image specifying information for specifying an image which is a correction object, and supplies them to the image processing section 53.

In step S12, the image processing section 53 reads out image data of a correction object (hereinafter, simply referred to as an image) from the image recording section 34a on the basis of image specifying information from the input control section 51.

In step S13, the correction processing section 53a of the image processing section 53 performs a correction process on the image data read out from the image recording section 34a (corrects the image) on the basis of correction instructions from the input control section 51, and supplies the image data to the display control section 54. For example, the correction processing section 53a performs correction processes of exposure correction or color tone correction, composition correction such as trimming or clipping (cutout), distortion correction and the like with respect to the image read out from the image recording section 34a. At this time, the correction processing section 53a generates correction parameters indicative of the above-mentioned correction content, and extracts photographing information, included originally in the image data, which is information when the image is photographed, from the image data.

Herein, the photographing information is information which includes conditions when a subject is photographed in the photographing section 32, or various constant numbers to be set in the photographing section 32 itself. For example, when an image (image signal) from the photographing section 32 is compressed and coded with JPEG (Joint Photographic Experts Group) type by the image processing section 53, Exif (Exchangeable image file format) information is included in the photographing information. In the Exif information, included are a photographing date and time, a maker name of a photographing apparatus, resolution of the whole image, photographing direction, a shutter speed, an aperture (F value), ISO sensitivity, a photometric mode, availability of a flash, an exposure correction step value, and a focal distance or the like. Further, in the photographing information, included, in addition to the Exif information, is information (photographing conditions) indicating conditions of photographing of a subject in the photographing section 32, such as composition information indicating image composition or a position of a subject within the image, or photographing mode information indicating a photographing mode to be set by a user.

In the following, although the photographing information is described to include the Exif information and the photographing condition, the photographing information is not limited to the Exif information, and may include, for example, other information such as information relating to an image process in the image processing section 53, or position information from a GPS (Global Positioning System) device which is not shown.

In step S14, the display control section 54 generates display data for displaying a corrected image on the basis of image data, on which a correction process is performed, from the image processing section 53, and supplies the display data to the display section 35, to thereby display the image on the display section 35.

In step S15, the correction data acquiring section 55 acquires correction parameters generated by the correction processing section 53a, and photographing information of the image corrected in the correction processing section 53a, as correction data. That is, the correction data relating to correction are composed of the correction parameters.

In step S16, the correction data acquiring section 55 supplies correction data acquired from the correction processing section 53a to the correction data recording section 34b of the recording section 34, and records the correction data.

With the above-mentioned processes, when correction of the image is instructed by a user, correction data relating to correction performed in accordance with the instructions are recorded.

Figure 3:
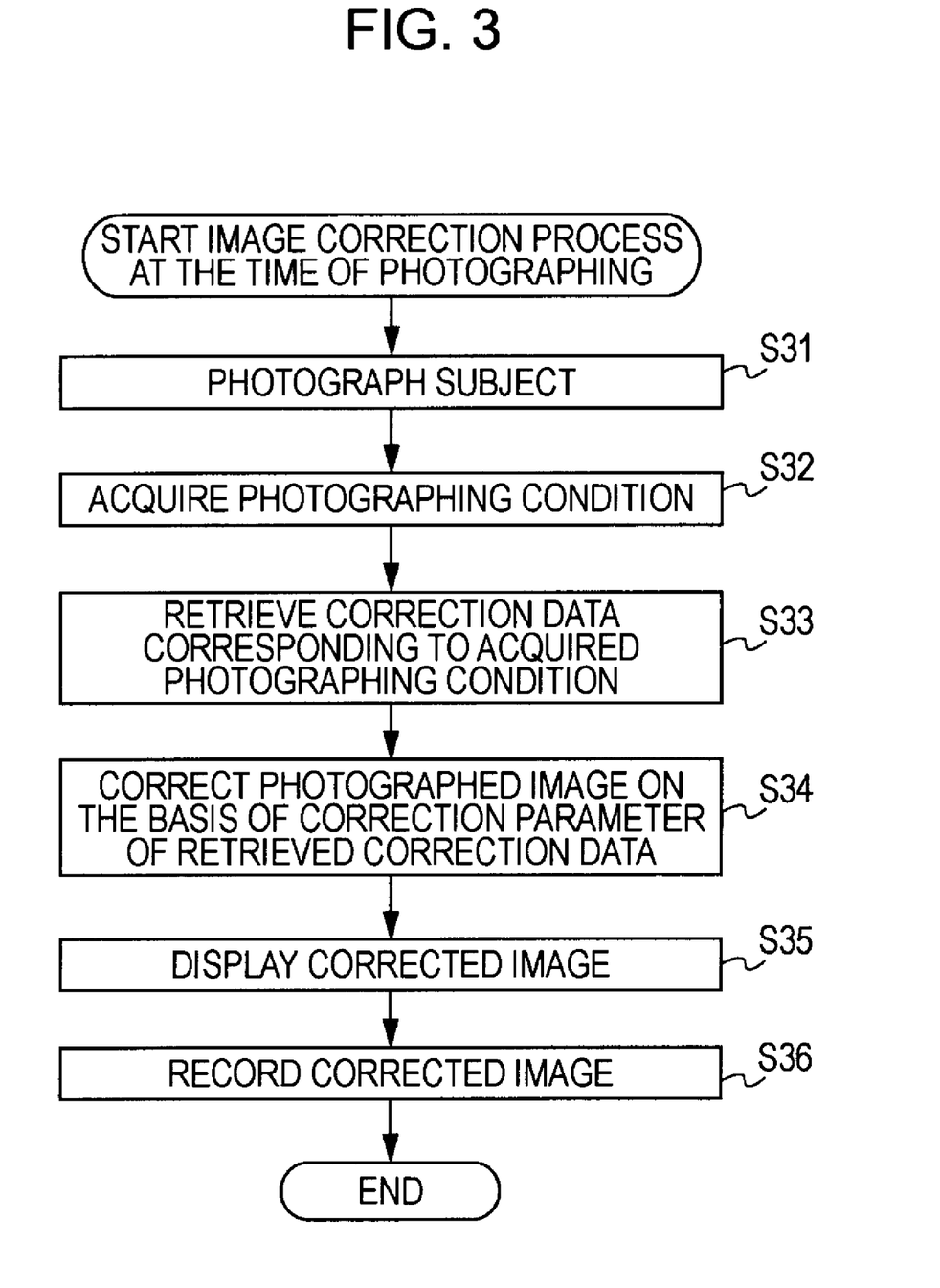
FIG. 3 is a flow chart for describing the image correction process at the time of photographing.

Image Correction Process at the time of Photographing by the Photographing Apparatus Next, an image correction process at the time of photographing by the photographing apparatus 11 will be described with reference to a flow chart of FIG. 3. When the image correction process at the time of photographing is executed, the correction data described with reference to the flow chart of FIG. 2 is recorded in the correction data recording section 34b of the photographing apparatus 11.

The photographing apparatus 11 starts a process when, for example, the input section 31 is operated, and the input control section 51 acquires instructions of selection of a correction data applying mode (image correction).

In step S31, the photographing section 32 converts the image of the subject into an image signal which is an electrical signal on the basis of control of the photographing control section 52, that is, photographs the subject, and supplies the obtained image signal to the photographing control section 52. The photographing control section 52 supplies the image signal from the photographing section 32 to the image processing section 53.

In step S32, the photographing condition acquiring section 56 acquires information (photographing conditions) indicating photographing conditions of photographing of the subject in the photographing section 32 from the photographing section 32 via the photographing control section 52, and supplies the information to the correction data retrieving section 57. In the photographing conditions acquired here, for example, included is information which is included in the Exif information such as a photographing date and time or a shutter speed, an aperture (F value) and a focal distance, in addition to composition information indicating image composition or a position of the subject within the image, or photographing mode information indicating a photographing mode to be set by a user.

In step S33, the correction data retrieving section 57 retrieves correction data corresponding to the photographing conditions, which are supplied from the photographing condition acquiring section 56, from the correction data recorded in the correction data recording section 34b of the recording section 34. More particularly, the correction data retrieving section 57 retrieves correction data, which include photographing conditions identical with or similar to the photographing conditions supplied from the photographing condition acquiring section 56, from the correction data recorded in the correction data recording section 34b. The correction data retrieving section 57 supplies correction parameters of the retrieved correction data to the correction processing section 53a.

For example, when composition information is included in the photographing conditions from the photographing condition acquiring section 56, the correction data retrieving section 57 retrieves correction data, which include composition information indicating closer composition in composition represented by the composition information, from the correction data recording section 34b. In addition, when a focal distance is included in the photographing conditions from the photographing condition acquiring section 56, the correction data retrieving section 57 retrieves the correction data of the Exif information, including the same focal distance as the focal distance, from the correction data recording section 34b. In the meantime, when a plurality of correction data exist which include photographing conditions identical with or similar to the photographing conditions from the photographing condition acquiring section 56, for example, correction data having the highest similarity of the photographing conditions or the latest photographing data and time of the Exif information may be retrieved.

In step S34, the correction processing section 53a performs (corrects the image) a predetermined correction process on the image data from the photographing control section 52 on the basis of correction parameters of the correction data retrieved by the correction data retrieving section 57. For example, when the correction parameters are parameters for color tone correction, the correction processing section 53a performs a color tone correction process to be represented by the correction parameters with respect to the image data from the photographing control section 52. In addition, when the correction parameters are parameters for distortion correction, the correction processing section 53a performs a distortion correction process to be represented by the correction parameters with respect to the image data from the photographing control section 52.

In step S35, the display control section 54 generates display data for displaying the corrected image on the basis of the image data on which the correction process is performed in the correction processing section 53a of the image processing section 53, and supplies the display data to the display section 35, to thereby display the image on the display section 35.

In step S36, the image processing section 53 supplies the image data, on which the correction process is performed, to the image recording section 34a of the recording section 34, to thereby record the corrected image in the image recording section 34a.

With the above-mentioned processes, when the image is photographed, the photographed image is corrected on the basis of correction data corresponding to the photographing conditions at the time. Therefore, since it is possible to perform the same correction as correction having been performed in the past with respect to the image to be photographed under the same conditions as the image having been corrected in the past by a user, an image which is more suiting a user's taste is able to be photographed.

As described above, although the image correction process is performed at the time of photographing the image (just after photographing) on the basis of the correction data retrieved in accordance with the photographing conditions, it is also possible to adjust parameters relating to photographing (photographing parameters) before photographing the image on the basis of the correction data retrieved in accordance with the photographing conditions.

Photographing Parameter Adjusting Process of the Photographing Apparatus

Figure 4:
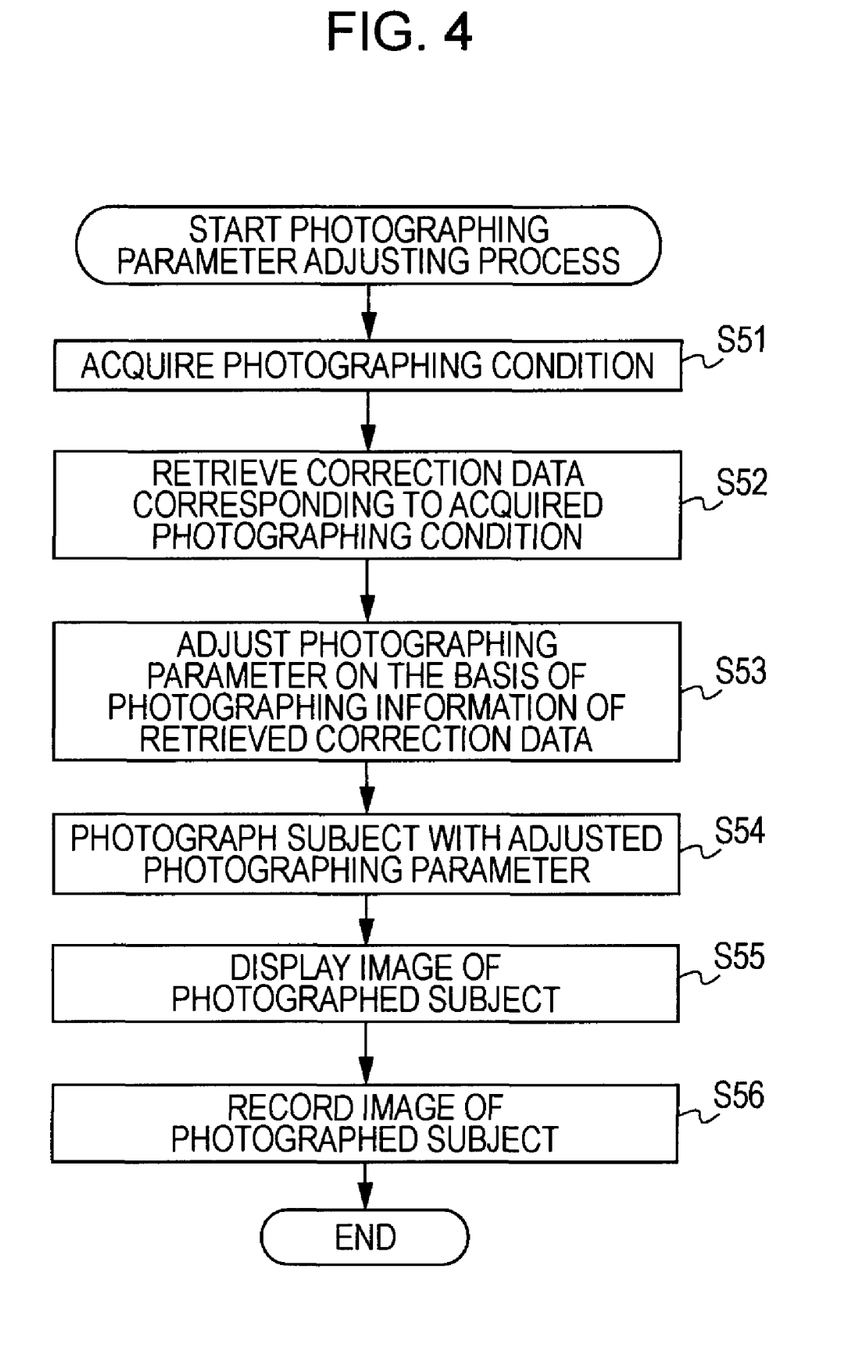
FIG. 4 is a flow chart for describing a photographing parameter adjusting process before photographing.

A photographing parameter adjusting process before photographing by the photographing apparatus 11 will be described with reference to a flow chart of FIG. 4. When the photographing parameter adjusting process before photographing is executed, the correction data described with reference to the flow chart of FIG. 2 are recorded in the correction data recording section 34b of the photographing apparatus 11.

The photographing apparatus 11 starts a process when, for example, the input section 31 is operated, and the input control section 51 acquires instructions of selection of a correction data applying mode (photographing parameter adjustment).

In step S51, the photographing condition acquiring section 56 acquires information (photographing condition), which indicates the photographing conditions of photographing of the subject in the photographing section 32, from the photographing section 32 via the photographing control section 52, and supplies the information to the correction data retrieving section 57.

In step S52, the correction data retrieving section 57 retrieves correction data, corresponding to the photographing conditions supplied from the photographing condition acquiring section 56, from the correction data recorded in the correction data recording section 34b of the recording section 34. More particularly, the correction data retrieving section 57 retrieves correction data which include photographing conditions identical with or similar to the photographing conditions supplied from the photographing condition acquiring section 56, from the correction data recorded in the correction data recording section 34b. The correction data retrieving section 57 supplies photographing information of the retrieved correction data to the photographing control section 52.

In step S53, the photographing control section 52 adjusts photographing parameters which are parameters relating to photographing in the photographing section 32 on the basis of the photographing information of the correction data retrieved by the correction data retrieving section 57. Here, the photographing parameters are values included in the Exif information such as resolution of the whole image, a photographing direction, a shutter speed, an aperture (F value), ISO sensitivity, a photometric mode, availability of a flash, an exposure correction step value, and a focal distance. That is, the photographing control section 52 adjusts the photographing parameters so that the photographing parameters in the photographing section 32 have the same values as the Exif information included in the photographing information of the correction data from the correction data retrieving section 57.

In step S54, when instructions of photographing by a user are input from the input section 31, the photographing section 32 photographs the subject with the photographing parameters adjusted by the photographing control section 52, and supplies the obtained image signal to the photographing control section 52. The photographing control section 52 supplies the image signal from the photographing section 32 to the image processing section 53.

In step S55, the display control section 54 generates display data for displaying the photographed image on the basis of the image data supplied from the photographing control section 52 to the image processing section 53, and supplies the display data to the display section 35, to thereby display the image to the display section 35.

In step S56, the image processing section 53 supplies the image data supplied from the photographing control section 52 to the image recording section 34a of the recording section 34, to thereby record the photographed image in the image recording section 34a.

With the above-mentioned processes, before the image is photographed, the photographing parameters are adjusted on the basis of correction data corresponding to photographing conditions at the time. Therefore, since it is possible to perform photographing under the same conditions as the case where photographing has been performed in the past with respect to the image photographed under the same conditions as the image having been corrected in the past by a user, an image which is more suiting a user's taste is able to be photographed.

Hereinbefore, there has been described the configuration for performing the processes based on the correction data as mentioned above with a unit of the photographing apparatus 11. For example, another apparatus performs the image correction process on an image photographed by the photographing apparatus, and correction data for correction thereof are provided to the photographing apparatus, so that the photographing apparatus is also able to perform a process based on the correction data.

2. Second Embodiment

Configuration Example of an Image Processing System

Figure 5:
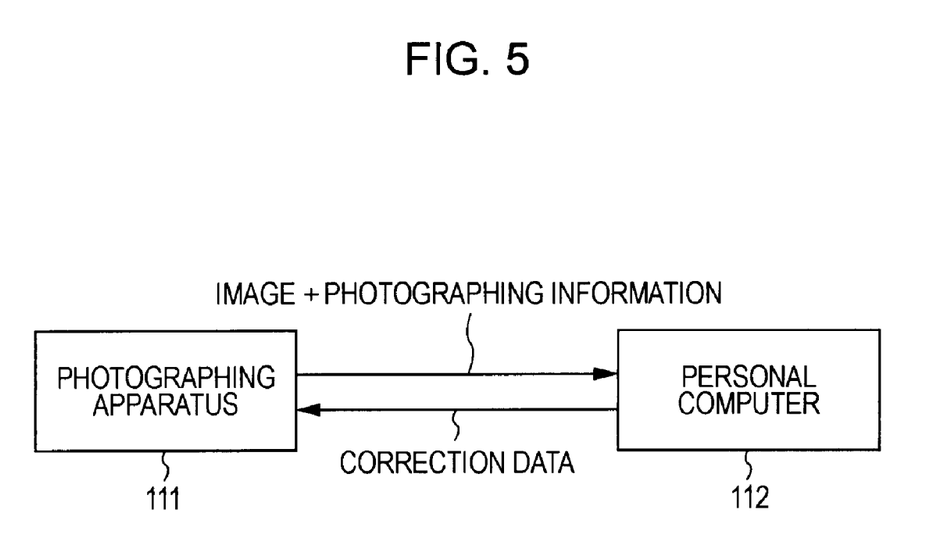
FIG. 5 is a block diagram illustrating a configuration example of an image processing system.

First, reference is made to FIG. 5 to describe the configuration of an image processing system in which the photographing apparatus performs a process based on correction data, by causing a personal computer to perform an image correction process on an image photographed by the photographing apparatus, and providing the correction data for correction thereof to the photographing apparatus.

The image processing system of FIG. 5 includes a photographing apparatus 111 and a personal computer 112. The photographing apparatus 111 and the personal computer 112 are connected with, for example, a USB (Universal Serial Bus) cable and the like. The photographing apparatus 111 photographs a subject, and transmits the obtained image and photographing information relating to photographing to the personal computer 112. The personal computer 112 performs predetermined correction on the image from the photographing apparatus 111 on the basis of an operation of a user, to thereby generate correction data and transmit the correction data to the photographing apparatus 111. The photographing apparatus 111 performs an image correction process or a photographing parameter adjusting process at the time of photographing on the basis of the correction data transmitted from the personal computer 112.

Other Configuration Example of the Photographing Apparatus

Next, the configuration of the photographing apparatus 111 in the image processing system of FIG. 5 will be described with reference to FIG. 6. Meanwhile, in the photographing apparatus 111 of FIG. 6, the constituent parts having the same function as those provided to the photographing apparatus 11 of FIG. 1 are designated with the same names and reference numerals, and the description thereof is appropriately omitted herein.

Figure 6:
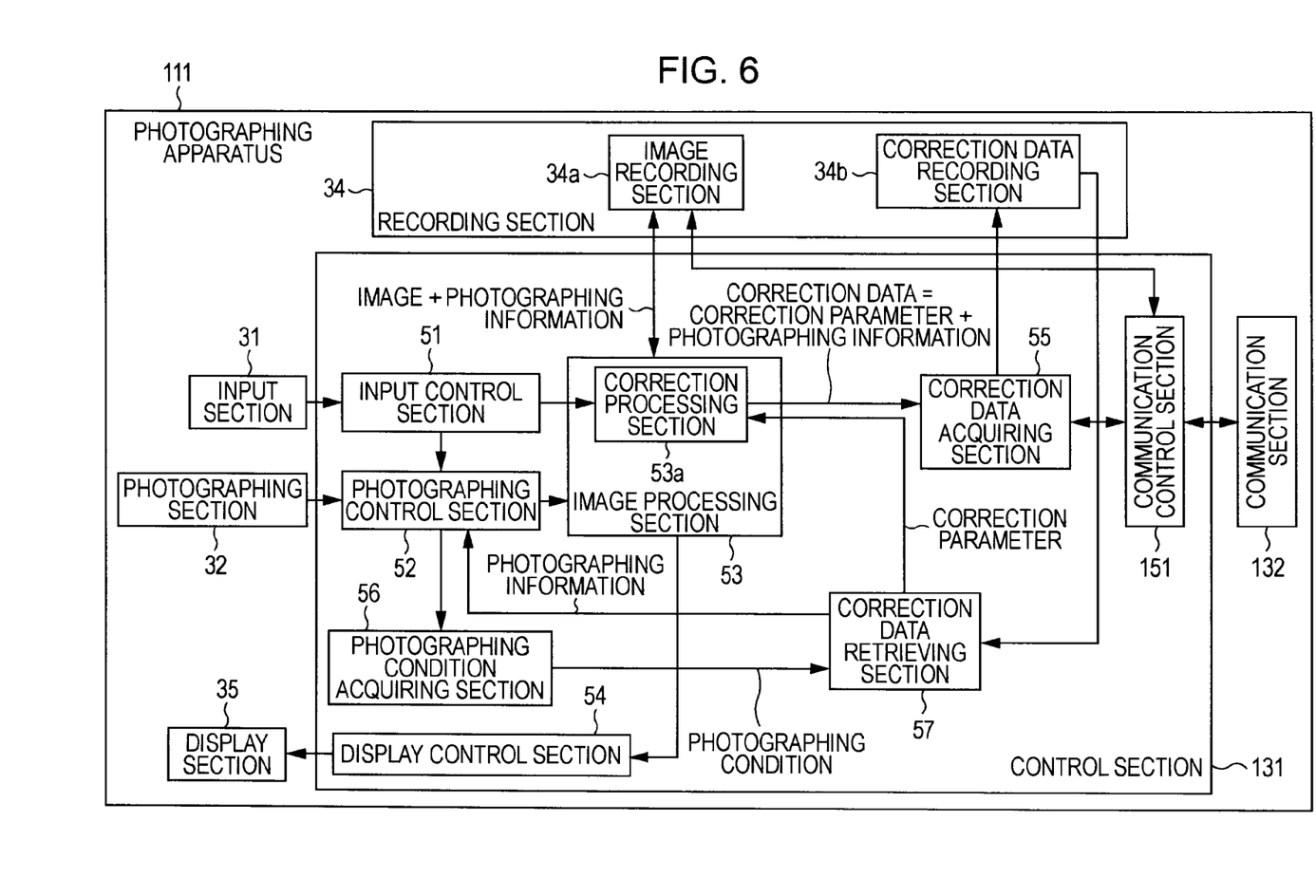
FIG. 6 is a block diagram illustrating a configuration example of a photographing apparatus in the image processing system of FIG. 5.

That is, in the photographing apparatus 111 of FIG. 6, the difference with the photographing apparatus 11 of FIG. 1 is that a control section 131 is provided in place of the control section 33, and that a communication section 132 is newly provided. Further, in the control section 131 of FIG. 6, the difference with the control section 33 of FIG. 1 is that a communication control section 151 is newly provide.

The communication section 132 performs communication with the personal computer 112 on the basis of control of the communication control section 151.

The communication control section 151 controls communication in the communication section 132. More particularly, the communication control section 151 acquires the image recorded in the image recording section 34a and photographing information corresponding to the image, and transmits them to the communication section 132 with respect to the personal computer 112. In addition, the communication control section 151 causes the communication section 132 to receive correction data transmitted from the personal computer 112, and supplies the correction data to the correction data recording section 34b via the correction data acquiring section 55.

With the above-mentioned configuration, the photographing apparatus 111 transmits the image and the photographing information corresponding to the image to the personal computer 112, and receives the correction data transmitted from the personal computer 112 in response to this, to allow recording to be performed.

Configuration Example of the Personal Computer

Next, the configuration of the personal computer 112 in the image processing system of FIG. 5 will be described with reference to FIG. 7. Meanwhile, in the personal computer 112 of FIG. 7, the constituent parts having the same function as those provided to the photographing apparatus 11 of FIG. 1 are designated with the same names and reference numerals, and the description thereof is appropriately omitted herein.

Figure 7:
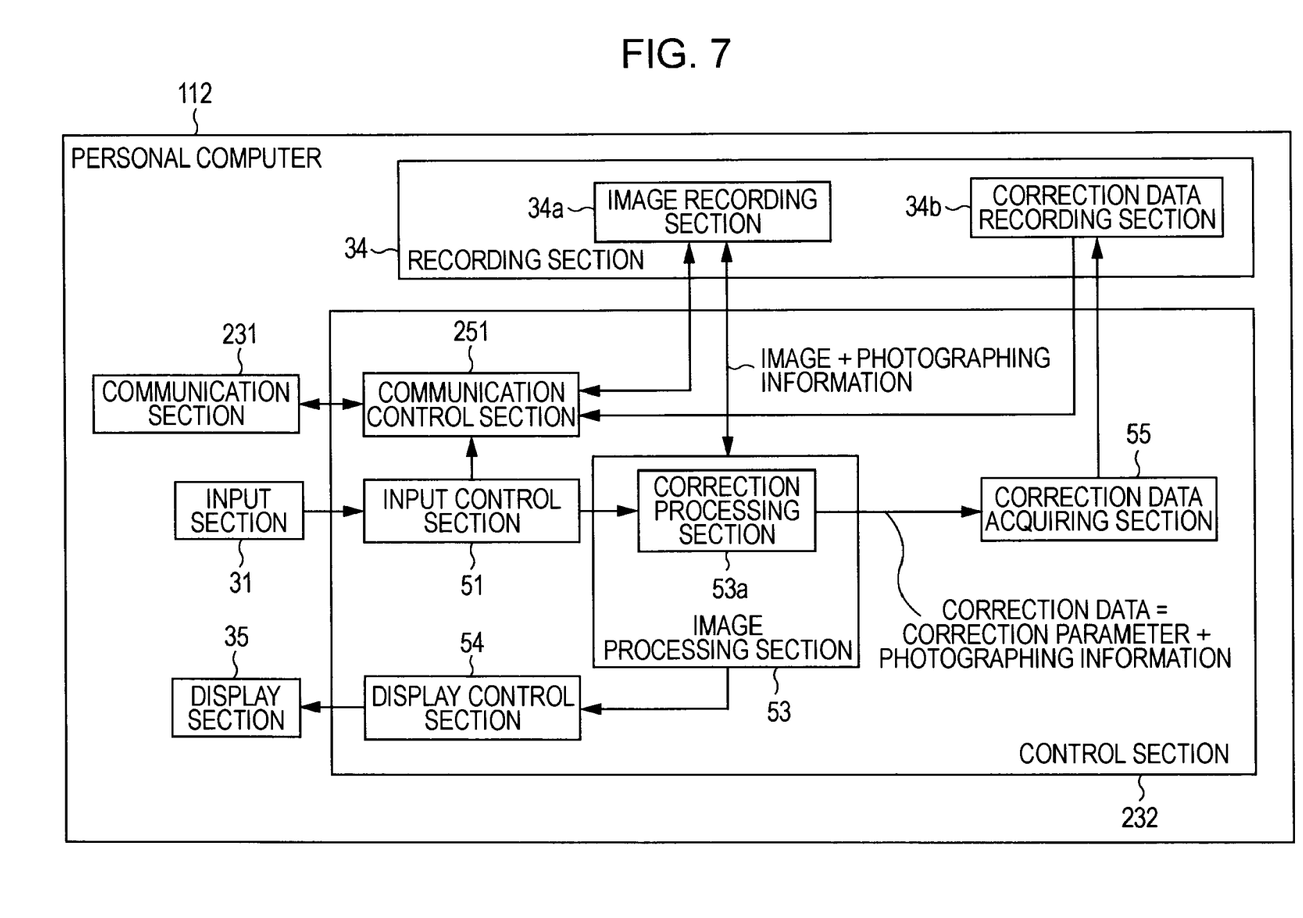
FIG. 7 is a block diagram illustrating a configuration example of a personal computer in the image processing system of FIG. 5.

That is, in the personal computer 112 of FIG. 7, the difference with the photographing apparatus 11 of FIG. 1 is that the photographing section 32 is eliminated, a communication section 231 is newly provided, and a control section 232 is provided in place of the control section 33. Further, in the control section 232 of FIG. 7, the difference with the control section 33 of FIG. 1 is that the photographing control section 52, the photographing condition acquiring section 56, and the correction data retrieving section 57 are eliminated, and a communication control section 251 is newly provided.

The communication section 231 performs communication with the photographing apparatus 111 on the basis of control of the communication control section 251.

The communication control section 251 controls communication in the communication section 231. More particularly, the communication control section 251 causes the communication section 231 to receive an image and photographing information transmitted from the photographing apparatus 111, and supplies them to the image recording section 34a. In addition, the communication control section 251 acquires correction data recorded in the correction data recording section 34b, and transmits the correction data to the communication section 231 with respect to the photographing apparatus 111.

With the above-mentioned configuration, the personal computer 112 performs predetermined correction on the image transmitted from the photographing apparatus 111, to thereby allow correction data relating to the correction to be transmitted to the photographing apparatus 111.

Image Correction Process by the Personal Computer in the Image Processing System Next, an image correction process by the personal computer 112 in the image processing system will be described. When the image correction process is executed, the image transmitted from the photographing apparatus 111 is previously recorded in the image recording section 34a of the personal computer 112.

Meanwhile, the image correction process by the personal computer 112 is the same as the process of the photographing apparatus 11 except that in the image correction process described with reference to FIG. 2, after step S16, the communication control section 251 acquires the correction data recorded in the correction data recording section 34b, and transmits the correction data to the communication section 231 with respect to the photographing apparatus 111, the description thereof is omitted herein.

Image Correction Process at the Time of Photographing by the Photographing Apparatus in the Image Processing System Next, an image correction process at the time of photographing by the photographing apparatus 111 in the image processing system will be described. When the image correction process at the time of photographing is executed, correction data transmitted from the personal computer 112 is recorded in the correction data recording section 34b of the photographing apparatus 111.

Meanwhile, since the image correction process at the time of photographing by the photographing apparatus 111 is the same as the image correction process at the time of photographing by the photographing apparatus 11 as described with reference to FIG. 3, the description thereof is omitted herein.

Photographing Parameter Adjusting Process by the Photographing Apparatus in the Image Processing System In addition, since a photographing parameter adjusting process by the photographing apparatus 111 in the image processing system is the same as the photographing parameter adjusting process by the photographing apparatus 11 as described with reference to FIG. 4 similarly to the image correction process at the time of photographing, the description thereof is omitted herein.

Therefore, it is possible to exhibit the same operational advantage as that of the photographing apparatus 11 of FIG. 1 even in the photographing apparatus 111 of FIG. 6.

Meanwhile, although an object to be connected to the photographing apparatus 111 has been described to be the personal computer 112 in FIG. 5, the object is not limited to it, and may be electronic devices for correcting an image on the basis of an operation of a user, such as, for example, a printer for printing an image. In addition, there may be used a method of connecting the photographing apparatus 111 and the personal computer 112 used as a server via Internet, and correcting an image recorded (saved) in the server from other terminal equipment connected via Internet.

In addition, as described above, although the photographing apparatus corrects the photographed image or adjusts photographing parameters on the basis of correction data corresponding to the photographing conditions, the photographing apparatus, for example, may present the image content correction or the photographing parameters to be set to a user, to thereby cause the user to correct the image or adjust the photographing parameters.

A series of processes described above can be not only executed by hardware, but also can be executed by software. When a series of processes are executed by software, a program which constructs the software is installed from a program recording medium into a computer incorporated in hardware for exclusive use, or, for example, a personal computer for general use which can execute various types of functions by installing various types of programs.

Figure 8:
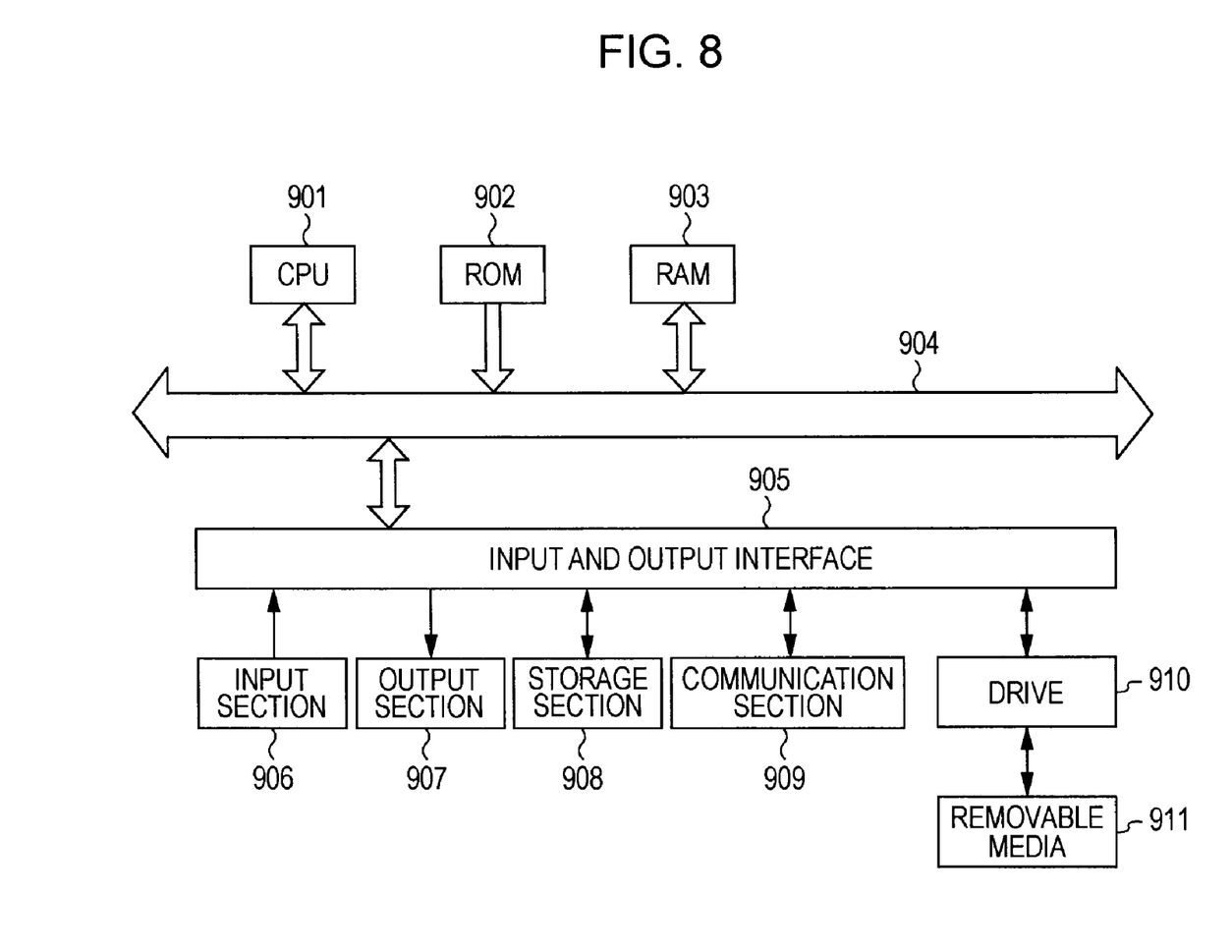
FIG. 8 is a block diagram illustrating a configuration example of computer hardware.

FIG. 8 is a block diagram illustrating a configuration example of hardware of a computer which executes a series of processes described above with a program.

In the computer, a CPU (Central Processing Unit) 901, a ROM (Read Only Memory) 902, and a RAM (Random Access Memory) 903 are connected to each other via a bus 904.

An input and output interface 905 is further connected to the bus 904. To the input and output interface 905, connected are an input section 906 including a keyboard, a mouse, a microphone and the like, an output section 907 including a display, a speaker and the like, a storage section 908 including a hard disk or a nonvolatile memory and the like, a communication section 909 including a network interface and the like, a drive 910 for driving a removable media 911 such as a magnetic disk, an optical disk, a magnetic optical disk, or a semiconductor memory.

In the computer constituted as described above, the CPU 901 loads, for example, a program stored in the storage section 908 into the RAM 903 via the input and output interface 905 and the bus 904 and executes the program, to thereby cause a series of processes described above to be performed.

A program to be executed by the computer (CPU 901) is recorded on the removable media 911 which is a package media including, for example, a magnetic disk (including a flexible disk), an optical disk (CD-ROM (Compact Disc-Read Only Memory), DVD (Digital Versatile Disc) and the like), a magnetic optical disk, or a semiconductor memory and the like, or is provided via a wired or wireless transmission medium such as local area network, Internet, and digital satellite broadcasting.

The program can be installed in the storage section 908 via the input and output interface 905 by mounting the removable media 911 in the drive 910. In addition, the program can be received in the communication section 909 via the wired or wireless transmission medium, and installed in the storage section 908. Furthermore, the program can be previously installed in the ROM 902 or the storage section 908.

Meanwhile, the program to be executed by the computer may be a program with which the processes are performed in chronological order along the sequence as described in the present specification, or may be a program with which the processes are performed in parallel, or at the necessary timing such as when call-out is made.

Further, in the present specification, the system represents the whole apparatus which is configured to include a plurality of devices.

The present application contains subject matter related to that disclosed in Japanese Priority Patent Application JP 2009-095792 filed in the Japan Patent Office on Apr. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A photographing apparatus comprising:
 a correction data acquiring means for acquiring correction data for image correction;
 a recording means for recording the correction data acquired by the correction data acquiring means;
 a photographing condition acquiring means for acquiring image photographing conditions;
 a retrieving means for retrieving the correction data, corresponding to the photographing conditions acquired by the photographing condition acquiring means, from the correction data recorded on the recording means;
 a photographing means for photographing an image on the basis of the correction data retrieved by the retrieving means; and
 a photographing control means for adjusting photographing parameters in the photographing means on the basis of the photographing information of the correction data retrieved by the retrieving means;
 wherein the correction data are configured to include correction parameters representing content of correction of the image, and photographing information which is information for photographing of the image,
 the photographing means photographs the image on the basis of the photographing parameters adjusted by the photographing control means,
 the photographing information is configured to include Exif (Exchangeable image file format) information of the image, and the photographing conditions when the image is photographed, and
 the photographing control means adjusts the photographing parameters in the photographing means, on the basis of the Exif information which is included in the photographing information corresponding to the photographing conditions acquired by the photographing condition acquiring means.

2. The photographing apparatus according to claim 1, further comprising a correction means for correcting the image photographed by the photographing means on the basis of the correction parameters of the correction data retrieved by the retrieving means.

3. A photographing method comprising the steps of:
acquiring correction data for image correction;
recording the correction data acquired by a process of the correction data acquiring step;
acquiring image photographing conditions;
retrieving the correction data, corresponding to the photographing conditions acquired by a process of the photographing condition acquiring step, from the correction data recorded by the recording step;
photographing an image on the basis of the correction data retrieved by a process of the retrieving step; and
adjusting photographing parameters on the basis of the photographing information of the correction data;
wherein the correction data are configured to include correction parameters representing content of correction of the image, and photographing information which is information for photographing of the image,
the image is photographed on the basis of the adjusted photographing parameters,
the photographing information is configured to include Exif (Exchangeable image file format) information of the image, and the photographing conditions when the image is photographed, and
the photographing parameters are adjusted on the basis of the Exif information which is included in the photographing information corresponding to the acquired photographing conditions.

4. A program that causes a computer to execute processes comprising the steps of:
acquiring correction data for image correction;
controlling recording of the correction data acquired by a process of the correction data acquiring step;
acquiring image photographing conditions;
retrieving the correction data, corresponding to the photographing conditions acquired by a process of the photographing condition acquiring step, from the correction data recorded by the recording controlling step;
controlling photographing of an image on the basis of the correction data retrieved by a process of the retrieving step; and
adjusting photographing parameters on the basis of the photographing information of the correction data;
wherein the correction data are configured to include correction parameters representing content of correction of the image, and photographing information which is information for photographing of the image,
the image is photographed on the basis of the adjusted photographing parameters,
the photographing information is configured to include Exif (Exchangeable image file format) information of the image, and the photographing conditions when the image is photographed, and
the photographing parameters are adjusted on the basis of the Exif information which is included in the photographing information corresponding to the acquired photographing conditions.

5. A photographing apparatus comprising:
a correction data acquiring section that acquires correction data for image correction;
a recording section that records the correction data acquired by the correction data acquiring section;
a photographing condition acquiring section that acquires image photographing conditions;
a retrieving section that retrieves the correction data, corresponding to the photographing conditions acquired by the photographing condition acquiring section, from the correction data recorded in the recording section;
a photographing section that photographs an image on the basis of the correction data retrieved by the retrieving section; and
a photographing control section for adjusting photographing parameters in the photographing section on the basis of the photographing information of the correction data retrieved by the retrieving section;
wherein the correction data are configured to include correction parameters representing content of correction of the image, and photographing information which is information for photographing of the image,
the photographing section photographs the image on the basis of the photographing parameters adjusted by the photographing control section,
the photographing information is configured to include Exif (Exchangeable image file format) information of the image, and the photographing conditions when the image is photographed, and
the photographing control section adjusts the photographing parameters in the photographing section, on the basis of the Exif information which is included in the photographing information corresponding to the photographing conditions acquired by the photographing condition acquiring section.

* * * * *